(12) United States Patent
Kim (10) Patent No.: US 11,500,896 B2
(45) Date of Patent: Nov. 15, 2022

(54) METHOD AND SYSTEM FOR SELECTIVELY SEPARATING ORGANIZATION DATA ACCORDING TO BUSINESS DIVISION

(71) Applicant: ARMIQ Co., Ltd., Seoul (KR)

(72) Inventor: Oxoo Kim, Seoul (KR)

(73) Assignee: Armiq Co. Ltd., Seoul (KR)

( * ) Notice: Subject to any disclaimer, the term of this patent is extended or adjusted under 35 U.S.C. 154(b) by 0 days.

(21) Appl. No.: 17/461,682

(22) Filed: Aug. 30, 2021

(65) Prior Publication Data
US 2022/0092076 A1    Mar. 24, 2022

(30) Foreign Application Priority Data

Sep. 18, 2020   (KR) .................... 10-2020-0120335
Oct. 6, 2020    (KR) .................... 10-2020-0128503

(51) Int. Cl.
| | | |
|---|---|---|
| *G06F 16/00* | (2019.01) | |
| *G06F 16/25* | (2019.01) | |
| *G06F 16/21* | (2019.01) | |
| *G06F 11/14* | (2006.01) | |
| *G06F 16/215* | (2019.01) | |
| *G06F 16/27* | (2019.01) | |
| *G06F 8/61* | (2018.01) | |

(52) U.S. Cl.
CPC ........ *G06F 16/258* (2019.01); *G06F 11/1446* (2013.01); *G06F 16/214* (2019.01); *G06F 16/215* (2019.01); *G06F 16/27* (2019.01); *G06F 8/63* (2013.01)

(58) Field of Classification Search
CPC .... G06F 16/214; G06F 16/215; G06F 16/258; G06F 16/27; G06F 11/1446; G06F 2201/80; G06F 8/63; G06Q 10/00
See application file for complete search history.

(56) References Cited

U.S. PATENT DOCUMENTS

| | | | | |
|---|---|---|---|---|
| 9,275,086 | B2 * | 3/2016 | Kumarasamy | ........ G06F 16/214 |
| 10,133,495 | B2 * | 11/2018 | Jain | ............ G06F 11/1435 |
| 10,768,961 | B2 * | 9/2020 | Bradshaw | ............ G06F 8/63 |
| 2005/0278341 | A1 * | 12/2005 | Kostadinov | ........... G06F 8/65 |
| 2019/0171650 | A1 * | 6/2019 | Botev | ............ G06F 16/2358 |

FOREIGN PATENT DOCUMENTS

| | | |
|---|---|---|
| KR | 10-20080102622 | 11/2008 |
| KR | 10-1505858 | 3/2015 |
| KR | 10-20170133866 | 6/2017 |
| KR | 10-20190013425 | 2/2019 |

\* cited by examiner

*Primary Examiner* — Diedra McQuitery
(74) *Attorney, Agent, or Firm* — Christensen O'Connor Johnson Kindness PLLC (57) ABSTRACT

It is provided a method and system for selectively separating organization for generating a second database by copying a first database, selecting data by mapping a condition of a deletion subject to a business object of the second database, extracting the selected data from the second database and saving it as a file, and generating a third database to be transferred by deleting data matched with the read data from a table in the second database.

8 Claims, 9 Drawing Sheets

METHOD AND SYSTEM FOR SELECTIVELY SEPARATING ORGANIZATION DATA ACCORDING TO BUSINESS DIVISION

CROSS-REFERENCE(S) TO RELATED APPLICATION(S)

This application claims the priority benefit of Korean Patent Application No. 10-2020-0120335, filed on Sep. 18, 2020, and Korean Patent Application No. 10-2020-0128503, filed on Oct. 6, 2020 in the Korean Intellectual Property Office, the disclosure of which is incorporated herein by reference.

BACKGROUND

1. Field of the Invention

The following description relates to method and system for selectively separating organization data according to business division.

2. Description of Related Art

Recently, mergers and acquisitions (M&A) of foreign and domestic companies are taking place. M&A is spotlighted as a keyword for company management.

Companies can continuously pursue growth and development by utilizing external resources, and enjoy effects of shortening the time required to enter a new market, avoiding friction with existing market participants, increasing market dominance, and introducing advanced technologies. Also, in order to adapt the changing environment, M&A activities liquidating existing marginal companies and pursuing acquisitions to secure new business engines are gradually increasing.

At this time, the buyer company wants the buyer's organization to continue business by requiring the transfer of the IT system of the sold company, and the sold company wants to avoid transferring its non-selling organization data as business asset. Accordingly, there is an increasing demand for a technology capable of accurately selecting, separating, transmitting, and converting a large number of data in the system according to the required purpose.

PRIOR ART DOCUMENT

Korean Patent Publication No. 10-2019-0013425

SUMMARY

A method and system for selectively separating organization data for generating a second database by copying a first database, selecting data by mapping a condition of a deletion subject to a business object of the second database, extracting the selected data from the second database and saving it as a filed, and generating a third database to be transferred by deleting data matched with the read data from a table in the second database is provided.

A method for selectively separating organization data of a computer device including at least one processor may include generating a second database by copying a first database of a first organization including data subject to be transferred to a second organization of the first organization, by the at least one processor; receiving input of a condition of a deletion subject for deleting in the second database, by the at least one processor; selecting data by mapping the condition of the deletion subject to a business object of the second database, by the at least one processor; extracting the selected data from the second database, by the at least one processor; saving the extracted data, by the at least one processor; and generating a third database to be transferred to the second organization by deleting data matched with the extracted data from a table in the second database, by the at least one processor.

According to one aspect of at least one example embodiment, the method for selectively separating organization data may further include reading the saved data, by the at least one processor; extracting secondarily related data connected with the read data from the second database, by the at least one processor; and saving the secondarily extracted data, by the at least one processor.

According to another aspect of at least one example embodiment, the condition of the deletion subject may be determined in at least one level of a company code level, a business area level, and a plant level by using a structure of an organization and a part of an organization to be divided in the organization.

According to another aspect of at least one example embodiment, the selecting may be configured to select data according to the condition of the deletion subject by mapping a business object corresponding to a particular company code of the company code level, a particular business area of the business area level, or a particular plant of the plant level.

According to another aspect of at least one example embodiment, the extracting may be configured to extract data of a table corresponding to the mapped business object from the second database as the selected data.

According to another aspect of at least one example embodiment, the saving may be configured to save the extracted data in the second database, another database or file by using a lossless compression algorithm.

According to another aspect of at least one example embodiment, the method for selectively separating organization data may further include restoring the third database to the second database by using the saved data as backup data, by the at least one processor.

A computer readable medium in which a computer program for executing the method in a computer device is recorded is provided.

A computer device may include at least one processor implemented to execute a computer readable instructions, and the computer device may be configured to, by the at least one processor, generate a second database by copying a first database of a first organization including data subject to be transferred to a second organization of the first organization, receive input of a condition of a deletion subject for deleting in the second database, select data by mapping the condition of the deletion subject to a business object of the second database, extract the selected data from the second database, save the extracted data, and generate a third database to be transferred to the second organization by deleting data matched with the extracted data from a table in the second database.

A third database may be generated by generating a second database by copying a first database, selecting data by mapping a condition of a deletion subject to a business object of the second database, extracting the selected data from the second database and saving it as a filed, and deleting data matched with the read data from a table in the second database.

DESCRIPTION OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

The present disclosure may be changed in various ways and may have various embodiments, and specific embodiments are illustrated in the drawings and described in detail. It is however to be understood that the present disclosure is not intended to be limited to the specific disclosure and that the present disclosure includes all changes, equivalents and substitutions which fall within the spirit and technological scope of the present disclosure. In the drawings, similar elements are assigned similar reference numerals.

Terms, such as a first, a second, A, and B, may be used to describe various elements, but the elements should not be restricted by the terms. The terms are used to only distinguish one element from the other element. For example, a first element may be named a second element without departing from the scope of rights of the present disclosure. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present disclosure. An expression of the singular number should be construed as including an expression of the plural number unless clearly defined otherwise in the context. It is to be understood that in this application, a term, such as "include (or comprise)" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

All the terms used herein, including technical terms or scientific terms unless defined otherwise in the specification, have the same meanings as those commonly understood by a person having ordinary skill in the art to which the present disclosure pertains. Terms, such as those commonly used and defined in dictionaries, should be construed as having the same meanings as those in the context of a related technology, and should not be construed as having ideal or excessively formal meanings unless explicitly defined otherwise in the specification.

Hereinafter, embodiments are described in detail with reference to the accompanying drawings.

A system for selectively separating organization data according to example embodiments may be implemented by a computer device, and a method for selectively separating organization data according to example embodiments may be performed by at least one computer device included in the system for selectively separating organization data. A computer program according to an example embodiment may be installed and driven in the computer device, and the computer device may perform the method for selectively separating organization data according to example embodiments according to control of the driven computer program. The above described computer program may be stored in a computer readable medium to execute the method for selectively separating organization data in the computer device in combination with the computer device.

Figure 1:
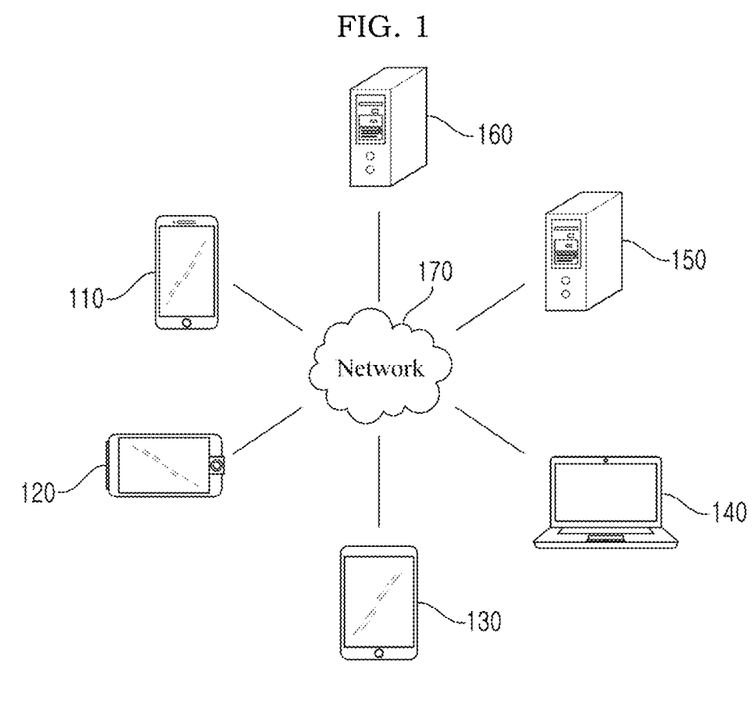
FIG. 1 illustrates an example of a network environment according to an example embodiment.

FIG. 1 illustrates an example of a network environment according to an example embodiment. FIG. 1 illustrates an example in which the network environment includes a plurality of electronic devices 110, 120, 130, and 140, a plurality of servers 150 and 160, and a network 170. FIG. 1 is an example for the description of embodiments, and the number of electronic devices or the number of servers is not limited to those illustrated in FIG. 1. Furthermore, the network environment of FIG. 1 illustrates an example of environments which may be applied to the present example embodiments, and an environment which may be applied to the present example embodiments is not limited to the network environment of FIG. 1.

The plurality of electronic devices 110, 120, 130, and 140 may be stationary devices or mobile devices implemented as a computer device. The plurality of electronic devices 110, 120, 130, and 140 include a smartphone, a mobile phone, a navigation device, a computer, a laptop computer, a terminal for digital broadcasting, personal digital assistants (PDA), a portable multimedia player (PMP), a tablet PC, etc. In FIG. 1, a shape of a smartphone is illustrated as being an example of the electronic device 110. However, in example embodiments of the present disclosure, the electronic device 110 may mean one of various physical computer devices capable of communicating with other electronic devices 120, 130 and 140 and/or the servers 150 and 160 over a network 170 substantially using a wireless or wired communication method.

A communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices for providing instructions, code, files, contents, or services through communication with the plurality of electronic devices 110, 120, 130, and 140 over the network 170. For example, the server 150 may be a system that provides services (e.g., a archiving service, a file distribution service, a map service, a content provision service, a group call service (or voice conference service), a messaging service, a mail service, a social network service, a map service, a translation service, a financial service, a settlement service, a search service, etc.).

Figure 2:
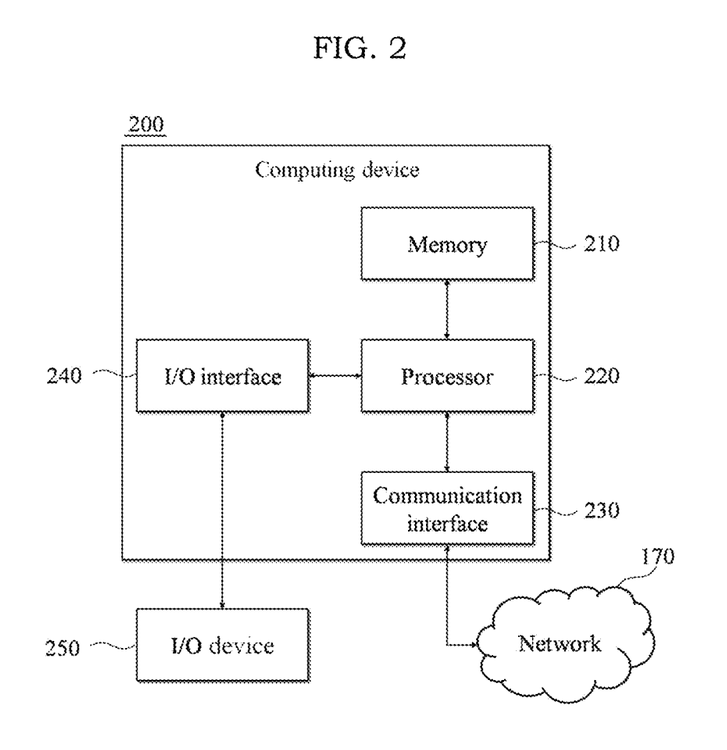
FIG. 2 is a block diagram illustrating an example of a computer device according to an example embodiment.

FIG. 2 is a block diagram illustrating an example of a computer device according to an example embodiment. Each of the plurality of electronic devices 110, 120, 130, and 140 or each of the servers 150 and 160 may be implemented by a computer device 200 illustrated in FIG. 2.

As illustrated in FIG. 2, the computer device 200 may include a memory 210, a processor 220, a communication interface 230, and an input/output (I/O) interface 240. The memory 210 is a computer-readable recording medium, and may include permanent mass storage devices, such as a random-access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, a memory card, and the like. In another example embodiment, software elements may be loaded onto the memory 210 through the communication interface 230 not a computer-readable recording medium. For example, the software elements may be loaded onto the memory 210 of the computer device 200 based on a computer program installed by files received over the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer device 200 to communicate with other devices (e.g. above described storing devices) over the network 170. For example, a request, a command, data or a file generated by the processor 220 of the computer device 200 based on program code stored in a recording device, such as the memory 210, may be provided to other devices over the network 170 under the control of the communication interface 230. Inversely, a signal, a command, data or a file from another device may be received by the computer device 200 through the communication interface 230 of the computer device 200 over the network 170. A signal, a command or a file received through the communication interface 230 may be transmitted to the processor 220 or the memory 210, and a file received through the communication interface 230 may be stored in a storage device (the aforementioned permanent storage device) which may be further included in the computer device 200.

The I/O interface 240 may be means for an interface with an input/output (I/O) device 250. For example, the input device may include a device, such as a microphone, a keyboard or a mouse. The output device may include a device, such as a display or a speaker. For another example, the I/O interface 240 may be means for an interface with a device in which functions for input and output have been integrated into one, such as a touch screen. The I/O devices 250, together with the computer device 200, may be configured as a single device Furthermore, in other example embodiments, the computer device 200 may include elements greater or smaller than the elements of FIG. 2. However, it is not necessary to clearly illustrate most of conventional elements. For example, the computer device 200 may be implemented to include at least some of the I/O devices 250 or may further include other elements, such as a transceiver and a database.

As an example of a method for physical separation of the system, a cleansing method and a migration method may be used. The cleansing method is a method for deleting remaining data except data to be transferred to a buyer organization among data of a sold organization and transferring it, and it may be used when volume of the data subject to be transferred is large and it needs to minimize downtime. Meanwhile, the migration method is a method for extracting data to be transferred to the buyer organization among data of the sold organization and transferring it, and it may be used when volume of the data subject to be transferred is small and data security is a priority. The method for physical separation of the system may be determined by considering various elements such as separation time of the organization, the sold subject, the system location, and the like. Hereinafter, a method for selectively separation organization data according to the cleansing method among the cleansing method and the migration method will be described.

Figure 3:
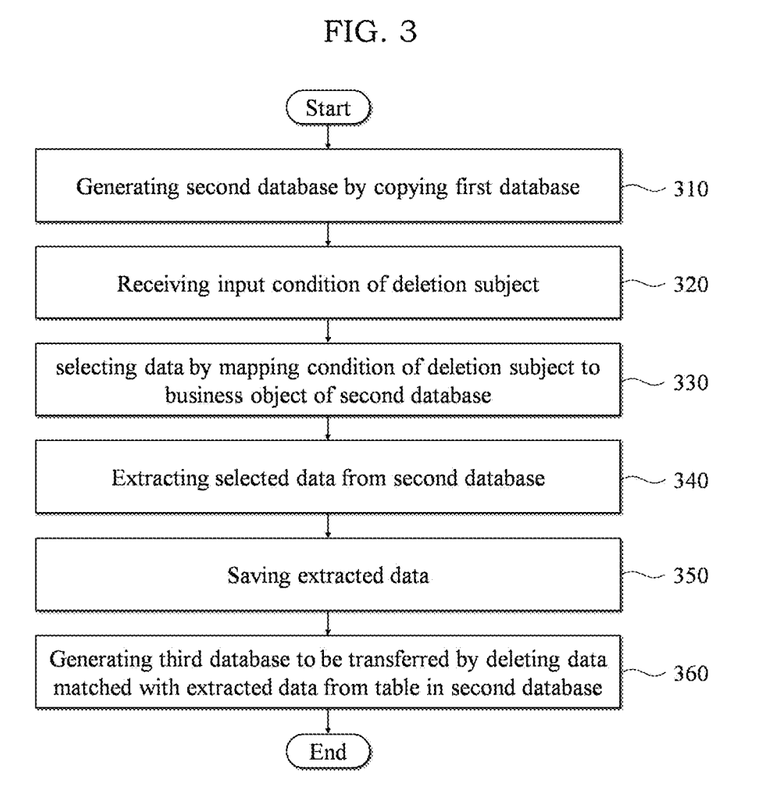
FIG. 3 is a flow chart illustrating an example of a method for selectively separating organization data according to an example embodiment.

FIG. 3 is a flow chart illustrating an example of a method for selectively separating organization data according to an example embodiment. The method for selectively separating organization data according to an example embodiment may be performed by the computer device 200 above described through FIG. 2. At this time, the processor 220 of the computer device 200 may be implemented to execute control instructions according to code of operating system included in the memory 210 or code of at least one computer program. Here, the processor 220 may control the computer 200 to perform Steps 310 to 360 included in the method of FIG. 3 according to control instructions provided by the code stored in the computer device 200.

In Step 310, the computer 200 may generate a second database by copying a first database. Here, the first database may be a database including data subject to be transferred. For example, in case that at least part (Organization B) of Organization A is sold to Organization C, the first database which is a database of Organization A may include the data subject to be transferred for Organization B to be transferred to Organization C. As another example, in case that Organization D is divided into Organization E (persistiveness) and Organization F (newly organized), the first database which is a database of Organization D may include data subject to be transferred to Organization F which is newly organized.

In Step 320, the computer device 200 may receive input of a condition of a deletion subject. The condition of the deletion subject may be determined in at least one level of a company code level, a business area level, and a plant level by using the structure of the organization and some of the organization to be divided in the organization. The condition of the deletion subject will be described in more detail through FIGS. 4 and 5.

In Step 330, the computer device 200 may select data by mapping the condition of the deletion subject with a business object. For example, the computer device 200 may select data corresponding to the condition of the deletion subject by mapping a business object corresponding to a particular company code of the company code level, a particular business area of the business area level, or a particular plant of the plant level. An example for selecting data in the second database of the organization will be described in more detail through FIGS. 6 and 7 and Table 1.

In Step 340, the computer device 200 may extract the selected data from the second database. For example the computer device 200 may extract data of a table corresponding to the mapped business object as the condition of the deletion subject, as the selected data.

In Step 350, the computer device 200 may save the extracted data. The extracted data, for example, may be saved in the same database (the second database) or a table in another separated database. As another example, the extracted data may be saved as a file in a local system or a remote control system. At this time, the extracted data in each example may be compressed by using a lossless compression algorithm such as ZIP, CTW, LZ77, LZW, gzip, bzip2, DEFLATE, and the like, and then may be saved in the table or as a file. Meanwhile, in case that restoration is needed after cleansing because of wrong cleansing condition, the saved data may be utilized as backup data for restoring. For example, the computer device 200 may restore the third database to the second database by using the saved data as the backup data.

At this time, the computer device 200 may read the data saved in Step 350, and then, may obtain consistency for extracting of the deletion subject by extracting secondarily related data connected with the read data from the second database. Also, the computer device 200 may save the secondarily extracted related data as a table or file. The process for extracting the related data will be described in more detail through FIG. 8.

In Step 360, the computer device 200 may generate the third database to be transferred by deleting data matched with the extracted data from the table in the second database. At this time, as described above, rather than directly deleting data from the second database, the consistency of the database may be maintained by extracting data according to the deletion condition, and extracting related data connected with the extracted data together. In addition, after extracting and saving the data related to the data according to the deletion condition, by deleting data matched with the extracted data from the second database, backup data which may restore the second database later may be obtained.

Figure 4:
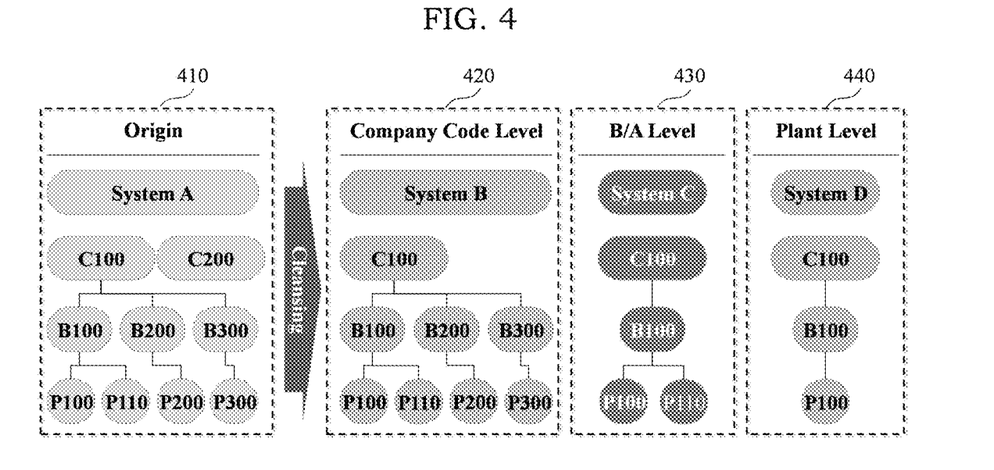
FIG. 4 illustrates an example of an organization structure according to an example embodiment.

FIG. 4 illustrates an example of an organization structure according to an example embodiment. Origin 410 represents an example of a structure of an organization to be divided or sold. In Origin 410, it is supposed that data of two companies C100 and C200 is managed through System A. Also, it is supposed that the first company C100 includes three business areas B100, B200, and B300, and a first plant P100 and a second plant P110 are included in the first business area B100, a third plant P200 is included in the second business area B200, and a fourth plant P300 is included in the third business area B300.

At this time, Company Code Level 420 represents an example of dividing the organization according to a company code in Origin 410. More particularly, data for the first company C100 may be subject to be transferred, and data for the second company C200 may be subject to be deleted.

Also, B/A Level 430 represents an example of dividing the organization according to B/A (Business Area) in Origin 410. More particularly, data for the first business area B100 may be subject to be transferred, and data for the rest (the second company C200, the second business are B200, and the third business area B300) may be subject to be deleted.

In addition, Plant Level 440 represents an example of dividing the organization according to plant in Origin 410. More particularly, data for the first plant P100 may be subject to be transferred, and data for the rest (the second company C200, the second business are B200, the third business area B300, and the second plant P110) may be subject to be deleted.

Figure 5:
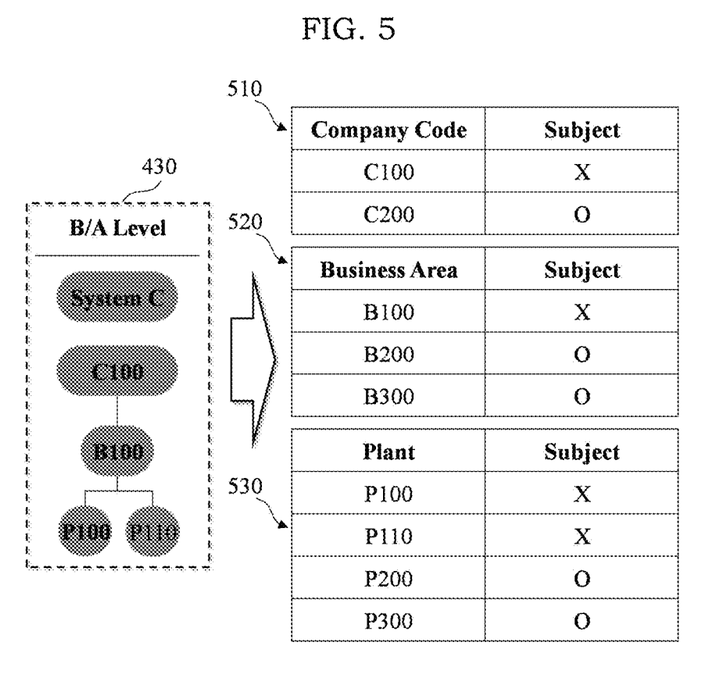
FIG. 5 illustrates an example of a deletion condition according to an example embodiment.

FIG. 5 illustrates an example of a deletion condition according to an example embodiment. In FIG. 5, like B/A Level 430, as data for the first business area B100 may be subject to be transferred and data for the rest (the second company C200, the second business are B200, and the third business area B300) may be subject to be deleted, it represents an example of defining a deletion condition as in three tables 510, 520, and 530. For example, in the first table 510, it is represented that data for the second company C200 is subject to be deleted in level of the company code, and in the second table 520, it is represented that data for the second business area B200 and the third business area B300 is subject to be deleted in level of the business area. Also, the third table 530 represents data for the third plant P200 and the fourth plant P300 is subject to be deleted in level of the plant.

Figure 6:
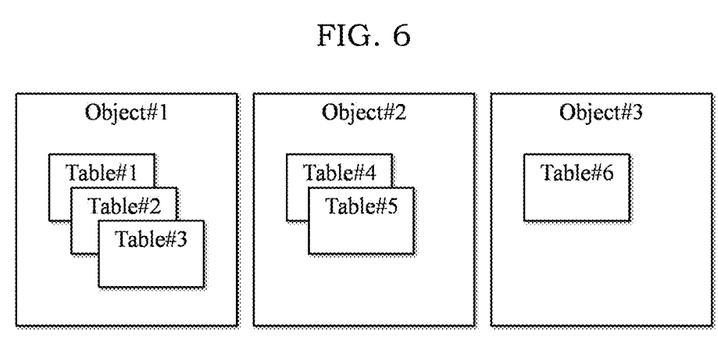
FIG. 6 illustrates an example of a business object according to an example embodiment.

FIG. 6 illustrates an example of a business object according to an example embodiment. FIG. 6 represents a business object 1 Object#1 including a table 1 Table#1, a table 2 Table#2, and a table 3 Table#3, a business object 2 Object#2 including a table 4 Table#4 and a table 5 Table#5, and a business object 3 Object#3 including a table 6 Table#6. Here, it may be seen that Table#1, Table#2, and Table#3 have dependence, and Table#4 and Table#5 have dependence. Such business object may be obtained by grouping data included in the database with minimal process processing unit on the basis of the dependence between tables in the database. For example, the computer device 200 may group tables having dependence in the database (e.g., the second database described in FIG. 3) as one object, and numerous objects may be defined according to the database. The dependence between tables may mean that two tables include each data identified through the same key value. At this time, the data identified through the same key value in the tables having dependence may include at least one different field.

Figure 7:
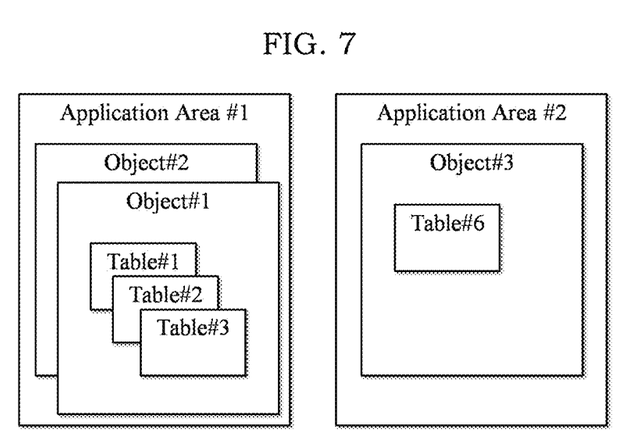
FIG. 7 illustrates an example of separating a business object to an application area according to an example embodiment.

FIG. 7 illustrates an example of separating a business object to an application area according to an example embodiment. FIG. 7 illustrates an example that a business object 1 Object#1 and a business object 2 Object #2 are classified to Application Area #1, and a business object 3 Object#3 is classified to Application Area #2. The Application Area may be variously defined according to setting in a company which maintains and manages a database for production, sale, materials, financial accounting, management accounting, infrastructure, communication, industry, and the like.

The below Table 1 represents an example of cleansing standards according to organization division unit as an example of mapping deletion condition to the business object.

TABLE 1

| Application Area | Business Object | Standard Table | Cleansing Organization Standard |
|---|---|---|---|
| Finance | Customer Master | TAB_A | Company code, Business Area |
| Materials | Materials Master | TAB_B | Plant |
| Finance | Financial accounting statement | TAB_C | Business Area |
| Materials | Materials statement | TAB_D | Plant |

For example, in case that a particular company code is designated as a deletion subject, since Business Area and Plant in the organization structure depend on the company, "Customer Master", "Materials Master", "Financial accounting statement", and "Materials statement" as the business objects related to the corresponding company code may be deleted. Meanwhile, in case that a particular plant is designated as a subject to be deleted, "Materials Master" and "Materials statement" as the business objects related to the corresponding plant may be deleted. As more particular examples, in case that organization is divided in Plant Level 430 of FIG. 4, "Materials Master" and "Materials statement" identified by the first plant P100 may be deletion subject data. According to example embodiments, there may be an exception excluded from the deletion subject. As an example, in addition to the organization, the cleansing standard may be combined with the period and used. As more particularly example, when an organization subject to be divided is converted from a business unit to a corporation based on the specific point in time, before the specific point in time, cleansing may be processed based on the business area, and after the specific point in time, cleansing may be processed based on the company code. As another example, in the personnel data of an organization that does not have an organization code or where resignation, reassignment, dispatch, and the like occur frequently, cleansing conditions may be defined according to the final personnel division based on 'employee number' in addition to the organization standard. As another example, in case of data that is difficult to classified by the organization standard such as documents, drawings, emails, etc., cleansing may be processed based on a data generator. For example, if data of an organization where the generator is included is subject to be transferred, data generated by the corresponding generator may be set to be subject to be transferred, and if data of the organization where the generator is included is not subject to be transferred, data generated by the corresponding generator may be set to be cleansing subject (deletion subject) data.

Figure 8:
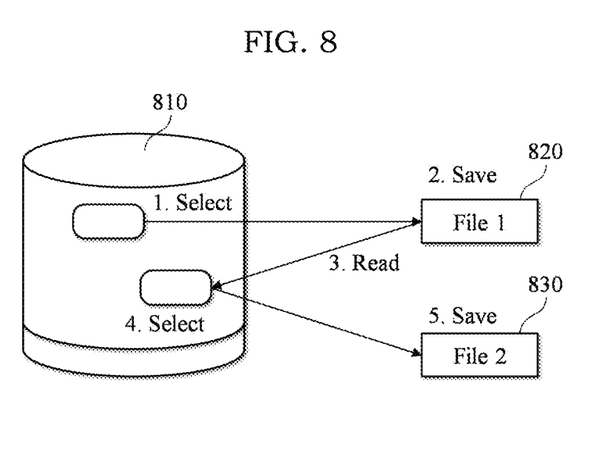
FIG. 8 illustrates an example of extracting selected data according to an example embodiment.

FIG. 8 illustrates an example of extracted selected data according to an example embodiment. The computer device 200 may select data from a second database 810 (1. Select) and extract it, and then, may save it in a file 1 820 (2. Save). After this, the computer device 200 may read the data saved in the file 1 820 (3. Read), select other related data connected with the corresponding data from the second database 810 (4. Select) and extract it, and then, may save it in a file 2 830 (5. Save). Therefore, computer device 200 may extract data from the second database 810 while maintaining consistency, and may process restoration of the second database 810 by wrong cleansing condition later by utilizing the data saved in the file 1 820 and the file 2 830 as backup data.

In such example embodiment of FIG. 8, the example for saving the extracted data in the file is described, but as already described, the extracted data may be saved in the same database 810 or a table of a separate database. Also, as already described, the extracted data may be compressed by using the lossless compression algorithm, and then, may be saved in the table or as a file.

Figure 9:
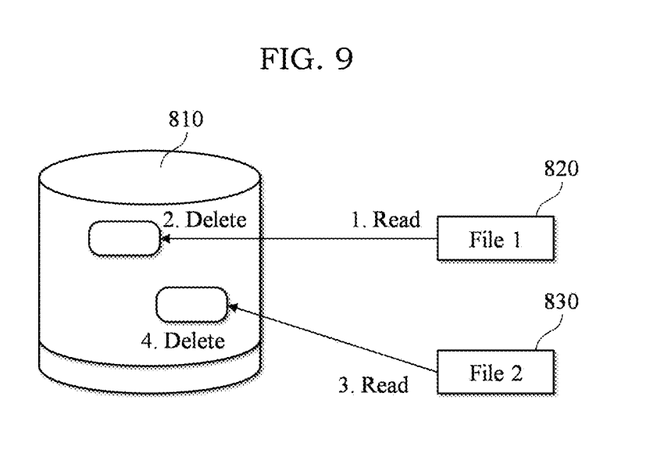
FIG. 9 illustrates an example of deleting data according to an example embodiment.

FIG. 9 illustrates an example of deleting data according to an example embodiment. The computer device 200 may read data in the file 1 820 generated in FIG. 8 (1. Read), and may delete data matched with the read data from the second database 810 (2. Delete). Also, the computer device 200 may read data in the file 2 830 generated in FIG. 8 (3. Read), and may delete data matched with the read data from the second database 810 (4. Delete). In other words, the computer device 200 may generate a third database where extracted data is deleted in the second database 810 by deleting all the extracted data from the second database 810. Meanwhile, the computer device 200 may process deletion of data in parallel by generating deleting process by each file in order to delete data more quickly.

Meanwhile, the computer device 200 may exceptionally directly delete data not exactly matched with the extracted data (the data read in files 820 and 830). For example, the computer device 200 may directly delete logical data that does not need to be backed up or is not important without saving.

Also, to shorten the data deletion period, Row-ID technology may be utilized. For example, the computer device 200 may immediately delete data of a corresponding location by using Row-ID value recording the location where data is saved, rather than after matching key values of the saved data and data to be deleted is compared, the matched data is deleted. To use such Row-ID, the computer device 200 may separately record Row-ID value of data to be deleted in advance in the process for extracting data.

Also, to shorten the data deletion period, the backup option may be skipped. For example, the computer device 200 may skip the process for extracting and saving at least part of data, and may shorten the data deletion period by immediately deleting the corresponding data from the second database 810.

Also, the computer device 200 may minimize downtime by first deleting the recent data based on the data generation point in time and deleting previous data later. In addition, the computer device 200 may minimize downtime by performing deletion based on the deletion priority of the data.

Meanwhile, when the third database is generated, it may be checked whether the deletion of the data is performed correctly. In such check, when data which is not subject to be deleted is deleted, incorrectly deleted data may be selectively restored in the third database. The selected data may be selectively restored by business object, cleansing point in time, detailed cleansing condition, table, and particular row in table. Such restoration is a countermeasure in case of an unexpected event, and it is a device to ensure data consistency when separating the system.

According to the example embodiments, the computer device 200 may transfer the generated third database to cloud. For example, the computer device 200 may allow the divided organization to use the separated data by transferring the third database to cloud used by the divided organization.

The system and device described herein may be implemented using hardware components, software components, and/or a combination thereof. For example, the device and components described in the example embodiments may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to the example embodiments may be implemented in the form of a program instruction executable by various computer means and stored in a computer-readable storage medium. The media may also include, alone or in combination with the program instructions, data files, data structures, and the like. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server. Examples of program instructions include both machine code, such as produced by a compiler, and higher level code that may be executed by the computer using an interpreter.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the invention in which an exclusive property or privilege is claimed are defined as follows:

1. A method for selectively separating organization data of a computer device including at least one processor, comprising:
   generating a second database by copying a first database of a first organization including data subject to be transferred to a second organization of the first organization, by the at least one processor;
   receiving input of a condition of a deletion subject for deleting in the second database, by the at least one processor;
   selecting data by mapping the condition of the deletion subject to a business object of the second database, by the at least one processor;
   extracting the selected data from the second database, by the at least one processor;
   saving the extracted data, by the at least one processor; and
   generating a third database to be transferred to the second organization by deleting data matched with the extracted data from a table in the second database, by the at least one processor.

2. The method of claim 1, further comprising:
   reading the saved data, by the at least one processor;
   extracting secondarily related data connected with the read data from the second database, by the at least one processor; and
   saving the secondarily extracted data, by the at least one processor.

3. The method of claim 1, wherein the condition of the deletion subject is determined in at least one level of a company code level, a business area level, and a plant level by using a structure of an organization and a part of an organization to be divided in the organization.

4. The method of claim 3, wherein the selecting is configured to select data according to the condition of the deletion subject by mapping a business object corresponding to a particular company code of the company code level, a particular business area of the business area level, or a particular plant of the plant level.

5. The method of claim 1, wherein the extracting is configured to extract data of a table corresponding to the mapped business object from the second database as the selected data.

6. The method of claim 1, wherein the saving is configured to save the extracted data in the second database, another database or file by using a lossless compression algorithm.

7. The method of claim 1, further comprising restoring the third database to the second database by using the saved data as backup data, by the at least one processor.

8. A computer device, comprising at least one processor implemented to execute a computer readable instruction, wherein the computer device is configured to, by the at least one processor, generate a second database by copying a first database of a first organization including data subject to be transferred to a second organization of the first organization;
receive input of a condition of a deletion subject for deleting in the second database;
select data by mapping the condition of the deletion subject to a business object of the second database;
extract the selected data from the second database;
save the extracted data; and
generate a third database to be transferred to the second organization by deleting data matched with the extracted data from a table in the second database.

\* \* \* \* \*